(12) United States Patent
Sakaguchi et al.

(10) Patent No.: US 10,774,237 B2
(45) Date of Patent: Sep. 15, 2020

(54) THERMOSETTING RESIN COMPOSITION

(71) Applicant: NISSAN CHEMICAL INDUSTRIES, LTD., Tokyo (JP)

(72) Inventors: Takahiro Sakaguchi, Funabashi (JP); Yuki Sugawara, Funabashi (JP); Isao Adachi, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 15 days.

(21) Appl. No.: 15/767,707

(22) PCT Filed: Sep. 23, 2016

(86) PCT No.: PCT/JP2016/078083
§ 371 (c)(1),
(2) Date: Apr. 12, 2018

(87) PCT Pub. No.: WO2017/064992
PCT Pub. Date: Apr. 20, 2017

(65) Prior Publication Data
US 2018/0305578 A1 Oct. 25, 2018

(30) Foreign Application Priority Data

Oct. 13, 2015 (JP) .................................. 2015-202266

(51) Int. Cl.
*C09D 163/10* (2006.01)
*C08F 283/01* (2006.01)
(Continued)

(52) U.S. Cl.
CPC ......... *C09D 163/10* (2013.01); *B05D 3/0254* (2013.01); *C08F 120/36* (2013.01);
(Continued)

(58) Field of Classification Search
CPC ...... C09D 163/10; C09D 7/63; C09D 167/06; B05D 3/0254; C08F 290/14;
(Continued)

(56) References Cited

U.S. PATENT DOCUMENTS 7,632,626 B2 * 12/2009 Sakamoto .......... C08G 59/4207
430/271.1

FOREIGN PATENT DOCUMENTS

JP    2000-344866 A    12/2000
JP    2008-031370 A    2/2008
(Continued)

OTHER PUBLICATIONS

Oct. 25, 2016 International Search Report issued in International Patent Application No. PCT/JP2016/078083.
(Continued)

*Primary Examiner* — Robert S Walters, Jr.
(74) *Attorney, Agent, or Firm* — Harris A. Pitlick

(57) ABSTRACT

A thermosetting resin composition, a thermosetting resin composition for protective films, a thermosetting resin composition for planarizing films, and a method for producing a cured film, a protective film, or a planarizing film by using the resin composition. A thermosetting resin composition has a polymer having a structural unit of Formula (1) below, a curing agent in an amount of 0% by mass to 30% by mass with respect to the polymer, and a solvent. When the thermosetting resin composition includes the curing agent, the curing agent is at least one compound selected from polyfunctional (meth)acrylate compounds and polyfunctional blocked isocyanate compounds:

(Continued)

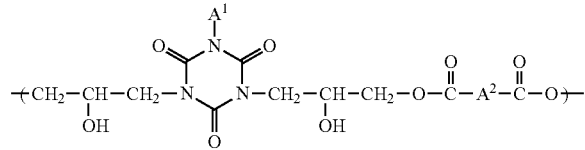

(wherein $A^1$ is a $C_2$ or $C_3$ alkenyl group or alkynyl group, and $A^2$ is a $C_2$ alkenylene group or alkynylene group).

10 Claims, 1 Drawing Sheet

(51) Int. Cl.
| | |
|---|---|
| C08F 220/14 | (2006.01) |
| C09D 167/06 | (2006.01) |
| C08F 120/36 | (2006.01) |
| C08G 59/14 | (2006.01) |
| C08F 299/04 | (2006.01) |
| C08G 63/685 | (2006.01) |
| C08F 212/08 | (2006.01) |
| C09D 7/63 | (2018.01) |
| B05D 3/02 | (2006.01) |
| C08G 59/17 | (2006.01) |

(52) U.S. Cl.
CPC .......... *C08F 212/08* (2013.01); *C08F 220/14* (2013.01); *C08F 283/01* (2013.01); *C08F 299/04* (2013.01); *C08G 59/14* (2013.01); *C08G 59/1466* (2013.01); *C08G 63/6858* (2013.01); *C09D 7/63* (2018.01); *C09D 167/06* (2013.01); *C08L 2203/16* (2013.01); *C08L 2203/206* (2013.01)

(58) Field of Classification Search
CPC .... C08F 299/04; C08F 283/01; C08F 220/14; C08F 120/36; C08F 212/08; C08G 59/14; C08G 59/1466; C08G 63/6858; C08L 2203/16; C08L 2203/206
See application file for complete search history.

(56) References Cited

FOREIGN PATENT DOCUMENTS

| JP | 4222457 B2 | 2/2009 |
|---|---|---|
| WO | 2006/115074 A1 | 11/2006 |
| WO | 2007/015427 A1 | 2/2007 |
| WO | 2012/169580 A1 | 12/2012 |
| WO | 2013/005619 A1 | 1/2013 |
| WO | 2015/019961 A1 | 2/2015 |

OTHER PUBLICATIONS

Oct. 25, 2016 Written Opinion issued in International Patent Application No. PCT/JP2016/078083.
Jun. 13, 2018 Office Action issued in Japanese Patent Application No. JP 2017-545133.

* cited by examiner

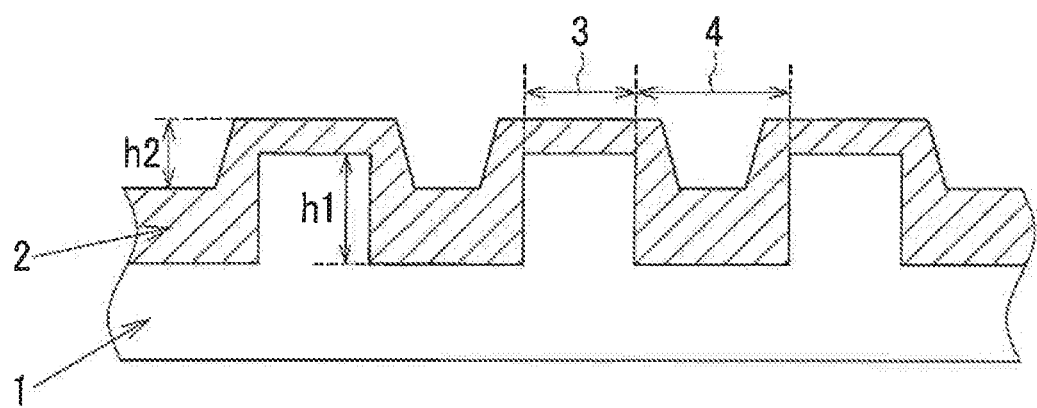

THERMOSETTING RESIN COMPOSITION

TECHNICAL FIELD

The present invention relates to a thermosetting resin composition, a thermosetting resin composition for protective films, a thermosetting resin composition for planarizing films, and a method for producing a cured film, a protective film, or a planarizing film by using the resin composition.

BACKGROUND ART

The process of producing electronic devices such as liquid crystal displays and CCD/CMOS image sensors involves treatment of exposure to a chemical solution such as a solvent or an acid or alkaline solution, and/or treatment of exposure to high temperatures, such as sputtering, dry etching, or reflow soldering. To prevent such treatment from causing deterioration of and damage to an element, a cured film having resistance to such treatment has been formed on the element, as a protective film. Such a protective film is required to have, for example, chemical resistance, high transparency, and heat resistance.

The above-mentioned electronic devices have projections and recesses that are originated from, for example, a color filter, a circuit wiring part, a light shielding film, or an inner lens. Therefore, from the viewpoint of securing a process margin at the time of manufacture of electronic devices and securing consistency in device characteristics, the above-mentioned cured film is also required to have level difference planarization properties (Patent Document 1 to Patent Document 4).

PRIOR ART DOCUMENTS

Patent Documents

Patent Document 1: Japanese Patent Application Publication No. 2000-344866 (JP 2000-344866 A)
Patent Document 2: Japanese Patent Application Publication No. 2008-031370 (JP 2008-031370 A)
Patent Document 3: Japanese Patent No. 4222457
Patent Document 4: International Publication No. 2013/005619 (WO 2013/005619)

SUMMARY OF THE INVENTION

Problem to be Solved by the Invention

The present invention has been completed based on the above circumstances. An object of the present invention is to provide a thermosetting resin composition capable of forming a cured film having excellent chemical resistance, heat resistance, transparency, and planarization properties. Another object of the present invention is to provide a cured film, a protective film, and a planarizing film, each having excellent chemical resistance, heat resistance, and transparency.

Means for Solving the Problem

As a result of intensive study for accomplishing the above-mentioned objects, the inventors of the present invention have completed the present invention. Specifically, the present invention provides a thermosetting resin composition comprising a polymer having a structural unit of Formula (1) below, a curing agent in an amount of 0% by mass to 30% by mass with respect to the polymer; and a solvent, wherein, when the thermosetting resin composition includes the curing agent, the curing agent is at least one compound selected from the group consisting of polyfunctional (meth) acrylate compounds and polyfunctional blocked isocyanate compounds:

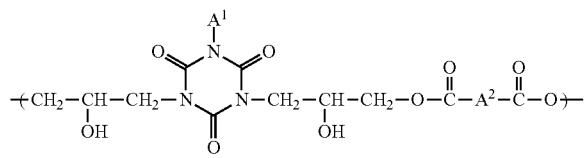

(1)

(wherein $A^1$ is a $C_2$ or $C_3$ alkenyl group or alkynyl group, and $A^2$ is a $C_2$ alkenylene group or alkynylene group).

The curing agent in an amount of 0% by mass to 30% by mass means that the thermosetting resin composition according to the present invention does not include a curing agent or includes the curing agent in an amount of up to 30% by mass with respect to 100% by mass of a polymer having a structural unit of Formula (1).

In the case where the thermosetting resin composition according to the present invention includes, as a curing agent, a polyfunctional (meth)acrylate compound, that is, a polyfunctional acrylate compound or a polyfunctional methacrylate compound, a polyfunctional acrylate compound is preferably included from the viewpoint of the heat resistance of a cured film produced from the resin composition.

Furthermore, the present invention provides a method for producing a cured film, a protective film, or a planarizing film. The method comprising: applying the above-mentioned thermosetting resin composition onto a substrate; and subsequently baking the thermosetting resin composition by using heating means.

Effects of the Invention

A cured film produced from the thermosetting resin composition according to the present invention has excellent chemical resistance, heat resistance, and transparency, Thus, with the cured film produced from the thermosetting resin composition according to the present invention, it is possible to significantly reduce possibilities of deterioration of or damage to an element when, a treatment of exposure to a solvent, or a chemical solution, such as an acid or alkaline solution, or a treatment of exposure to high temperatures, such as sputtering, dry etching, or reflow soldering is performed in the process of production thereof or the process of forming a peripheral device such as wiring. In addition, in the case where a protective film or a planarizing film is produced from the thermosetting resin composition according to the present invention and a resist is applied onto the film or in the case where the process of forming electrodes/wiring onto the film is performed, it is possible to significantly reduce problems, such as mixing with a resist and deformation and detachment of the protective film or the planarizing film due to a chemical solution. Hence, the thermosetting resin composition according to the present invention is suitable as a material for forming a protective film or a planarizing film.

BRIEF DESCRIPTION OF THE DRAWINGS

FIG. 1 is a schematic diagram of a cured film produced by applying a thermosetting resin composition according to the present invention onto a substrate with a level difference and baking the thermosetting resin composition.

MODES FOR CARRYING OUT THE INVENTION

The present invention provides a thermosetting resin composition comprising a specific polymer, a curing agent in an amount of 0% by mass to 30% by mass with respect to the polymer, and a solvent. Hereinafter, each component will be described in detail. The solid content, excluding the solvent, of the thermosetting resin composition according to the present invention is typically 0.01% by mass to 80% by mass.

<Polymer>

The polymer included in the thermosetting resin composition according to the present invention is a polymer having a structural unit of the above-mentioned Formula (1). Examples of a $C_2$ or $C_3$ alkenyl group as $A^1$ in Formula (1) include vinyl group and allyl group, and examples of a $C_2$ or $C_3$ alkynyl group as $A^1$ in Formula (1) include ethynyl group (—C≡CH group) and propargyl group (—CH$_2$—C≡CH group). Furthermore, examples of a $C_2$ alkenylene group as $A^2$ in Formula (1) include ethene-1,2-diyl group (—CH═CH— group), and examples of a $C_2$ alkynylene group as $A^2$ in Formula (1) include ethyne-1,2-diyl group (—CδC— group).

Examples of the above-mentioned polymer include a polymer having a structural unit of Formula (1a) below.

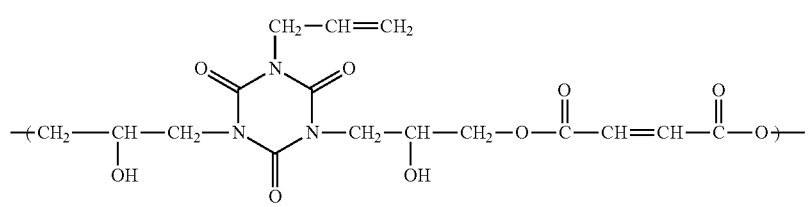

(1a)

The polymer having a structural unit of Formula (1a) can be produced by a polyaddition reaction of monoallyl diglycidyl isocyanurate with fumaric acid, maleic acid, or maleic anhydride (fumaric acid is preferable because of the ease of polymer synthesis) or a polyaddition reaction of monoallyl isocyanuric acid with diglycidyl fumarate or diglycidyl maleate.

The above-mentioned polyaddition reaction is preferably performed in a solution state in which the above-mentioned raw material monomers are dissolved in an organic solvent, such as benzene, toluene, xylene, ethyl lactate, butyl lactate, methyl pyruvate, propylene glycol monomethyl ether, propylene glycol monomethyl ether acetate, 2-butanone, 2-heptanone, cyclopentanone, cyclohexanone, methyl 3-methoxypropinoate, ethyl 3-ethoxypropionate, or N-methylpyrrolidone. Furthermore, in this polyaddition reaction, as a catalyst, use may be made of phosphines, such as triphenylphosphine, tributylphosphine, tris(4-methylphenyl)phosphine, tris(4-nonylphenyl)phosphine, tris(4-methoxyphenyl)phosphine, tris(2,6-dimethoxyphenyl)phosphine, and triphenylphosphine triphenylborane; quaternary phosphonium salts, such as tetraphenylphosphonium chloride, tetraphenylphosphonium bromide, benzyltriphenylphosphonium chloride, benzyltriphenylphosphonium bromide, ethyltriphenylphosphonium chloride, ethyltriphenylphosphonium bromide, tetraphenylphosphonium tetraphenyl borate, tetraphenylphosphonium tetra(4-methylphenyl)borate, tetraphenylphosphonium tetra(4-methoxyphenyl)borate, and tetraphenylphosphonium tetra(4-fluorophenyl)borate; and quaternary ammonium salts, such as tetraethyl ammonium chloride, benzyl trimethyl ammonium chloride, benzyl trimethyl ammonium bromide, benzyl triethyl ammonium chloride, benzyl triethyl ammonium bromide, benzyl tripropyl ammonium chloride, benzyl tripropyl ammonium bromide, tetramethyl ammonium chloride, tetraethyl ammonium bromide, tetrapropyl ammonium chloride, and tetrapropyl ammonium bromide may be used as a catalyst. Reaction temperature and reaction time for the above-mentioned polyaddition reaction are dependent on a compound used, concentration, and other conditions, and are suitably selected from reaction temperatures in a range of 20° C. to 200° C. and reaction time in a range of 0.1 hours to 100 hours. The above-mentioned catalyst, if used, may be used in an amount of 0.001% by mass to 30% by mass with respect to the total mass of raw material monomers used for the polyaddition reaction. The thus-obtained polymer is typically in a solution state in which the polymer is dissolved in the organic solvent, and the polymer in such a state can be used for the thermosetting resin composition according to the present invention without isolation.

The thus-obtained polymer solution is poured into a stirred poor solvent, such as hexane, diethyl ether, toluene, methanol, or water, to reprecipitate the polymer, the resultant precipitate is subjected to decantation or filtration, and washed if necessary, and subsequently dried at room temperature or dried by heating under atmospheric pressure or reduced pressure to make the polymer into a powder or an oily product. This operation allows an unreacted compound and the catalyst that are present together with the polymer to be removed. In the present invention, the oily product or the powder of the polymer may be used as it is. Alternatively, the oily product or the powder of the polymer may be redissolved in a later-mentioned solvent and used in a solution state.

The molar ratio of monoallyl diglycidyl isocyanurate to fumaric acid, maleic acid, or maleic anhydride for use in the above-mentioned polyaddition reaction is preferably from 3:2 to 2:3, more preferably from 5:4 to 4:5, or 1:1.

The molar ratio of monoallyl isocyanuric acid to diglycidyl fumarate or diglycidyl maleate that are used for the above-mentioned polyaddition reaction is preferably from 3:2 to 2:3, more preferably from 5:4 to 4:5, or 1:1.

The polymer typically has a weight-average molecular weight of 500 to 200,000, preferably 1,000 to 100,000. It should be noted that the weight-average molecular weight is a value obtained by gel permeation chromatography (SPG) using polystyrene as a standard sample.

As long as a polymer having a structural unit of Formula (1) is used as the above-mentioned polymer, the polymer may be used alone, or two or more thereof may be used in combination.

The polymer content of the thermosetting resin composition according to the present invention is typically 30% by mass to 100% by mass, preferably 50% by mass to 100% by mass, with respect to the solid content of the resin composition.

Examples of a method for preparing the thermosetting resin composition according to the present invention include, but not particularly limited to, a method of dissolving a polymer having a structural unit of Formula (1) in a solvent to prepare a uniform solution. Furthermore, at a suitable stage in this preparation method, for example, a curing agent and other additives may be added and mixed, as necessary.

<Solvent>

The solvent included in the thermosetting resin composition according to the present invention is not limited to a particular one as long as the solvent can dissolve the polymer included in the resin composition. Examples of such solvent include ethylene glycol monomethyl ether, ethylene glycol monoethyl ether, methyl cellosolve acetate, ethyl cellosolve acetate, diethylene glycol monomethyl ether, diethylene glycol monoethyl ether, propylene glycol, propylene glycol monomethyl ether, propylene glycol monomethyl ether acetate, propylene glycol monoethyl ether, propylene glycol monoethyl ether acetate, propylene glycol propyl ether acetate, propylene glycol monobutyl ether, propylene glycol monobutyl ether acetate, toluene, xylene, methyl ethyl ketone, cyclopentanone, cyclohexanone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropionate, ethyl 3-methoxypropionate, ethyl 3-ethoxypropionate, methyl 3-ethoxypropionate, methyl pyruvate, ethyl acetate, butyl acetate, ethyl lactate, butyl lactate, 2-heptanone, γ-butyrolactone, N-methylpyrrolidone, and N-ethylpyrrolidone. These solvents may be used alone, or two or more thereof may be used in combination.

From the viewpoint of improvement in the leveling properties of a coating formed by applying the thermosetting resin composition according to the present invention onto a substrate, among the above-mentioned solvents, use is preferably made of propylene glycol monomethyl ether, propylene glycol monomethyl ether acetate, propylene glycol monoethyl ether, propylene glycol monopropyl ether, 2-heptanone, ethyl lactate, butyl lactate, methyl pyruvate, methyl 3-methoxypropionate, ethyl 3-ethoxypropionate, cyclopentanone, cyclohexanone, and γ-butyrolactone.

<Curing Agent>

Although a cured film can be formed using the polymer included in the thermosetting resin composition according to the present invention, the resin composition may further include a curing agent for the purpose of improving the curability. Examples of the curing agent include a polyfunctional (meth)acrylate compound having two or more (meth)acryloyl groups in a molecule thereof, or a polyfunctional blocked isocyanate compound having two or more blocked isocyanate groups in a molecule thereof. In the case where a monomer compound is used as the curing agent, the number of (meth)acryloyl groups or blocked isocyanate groups in the monomer molecule is, for example, 2 to 15. These curing agents may be used alone, or two or more thereof may be used in combination. It should be noted that, in the present specification, (meth)acryloyl group refers to methacryloyl group and acryloyl group, (meth)acrylate refers to methacrylate and acrylate, and (meth)acrylic acid refers to methacrylic acid and acrylic acid.

Examples of the polyfunctional compound include ethylene glycol di(meth)acrylate, diethylene glycol di(meth)acrylate, triethylene glycol di(meth)acrylate, polyethylene glycol di(meth)acrylate, tetraethylene glycol di(meth)acrylate, propylene glycol di(meth)acrylate, dipropylene glycol di(meth)acrylate, tripropylene glycol di(meth)acrylate, polypropylene glycol di(meth)acrylate, 1,4-butanediol di(meth)acrylate, neopentyl glycol di(meth)acrylate, 1,6-hexanediol di(meth)acrylate, tricyclodecanedimethanol di(meth)acrylate, dicyclopentanyl di(meth)acrylate, bisphenol A di(meth)acrylate, ethoxylated bisphenol A di(meth)acrylate, propoxylated bisphenol A di(meth)acrylate, bisphenol S di(meth)acrylate, phthalic acid di(meth)acrylate, 9,9-bis[4-(2-(meth)acryloyloxyethoxy)phenyl]fluorene, glycerol di(meth)acrylate, glycerol tri(meth)acrylate, glycerol ethoxy tri(meth)acrylate, glycerol propoxy tri(meth)acrylate, trimethylolpropane tri(meth)acrylate, trimethylolpropane ethoxy tri(meth)acrylate, trimethylolpropane propoxy tri(meth)acrylate, ditrimethylolpropane tetra(meth)acrylate, pentaerythritol tri(meth)acrylate, pentaerythritol tetra(meth)acrylate, pentaerythritol ethoxy tetra(meth)acrylate, dipentaerythritol penta(meth)acrylate, dipentaerythritol hexa(meth)acrylate, sorbitol hexa(meth)acrylate, tris(2-(meth)acryloyloxyethyl)isocyanurate, and ε-caprolactone-modified tris-(2-(meth)acryloyloxyethyl)isocyanurate.

Examples of the polyfunctional (meth)acrylate compound also include polyfunctional urethane (meth)acrylates synthesized by reacting (meth)acrylate or polyfunctional (meth)acrylate having a hydroxy group, such as 2-hydroxyethyl (meth)acrylate, 4-hydroxybutyl (meth)acrylate, glycerol di(meth)acrylate, pentaerythritol tri(meth)acrylate, or dipentaerythritol penta(meth)acrylate, with a diisocyanate compound, such as 2,4-tolylene diisocyanate, 2,6-tolylene diisocyanate, 1,3-xylene diisocyanate, 1,4-xylene diisocyanate, xylylene diisocyanate, 1,5-naphthalene diisocyanate, m-phenylene diisocyanate, p-phenylene diisocyanate, diphenylmethane diisocyanate, 4,4'-diphenylmethane diisocyanate, 4,4'-dibenzyl diisocyanate, isophorone diisocyanate, 1,6-hexamethylene diisocyanate, dicyclohexylmethane diisocyanate, 2,2,4-trimethylhexamethylene diisocyanate, 2,4,4-trimethylhexamethylene diisocyanate, 1,3-bis(isocyanatomethyl)benzene, or 1,3-bis(isocyanatomethyl)cyclohexane.

Examples of the polyfunctional (meth)acrylate compound also include polyfunctional epoxy (meth)acrylates synthesized by reacting (meth)acrylic acid with a compound having two or more epoxy groups, such as ethylene glycol diglycidyl ether, propylene glycol diglycidyl ether, tripropylene glycol diglycidyl ether, glycerol diglycidyl ether, glycerol triglycidyl ether, 1,6-hexanediol diglycidyl ether, neopentyl glycol diglycidyl ether, bisphenol A diglycidyl ether, bisphenol E diglycidyl ether, bisphenol F diglycidyl ether, bisphenol S diglycidyl ether, hydrogenated bisphenol A diglycidyl ether, diglycidyl phthalate, diglycidyl terephthalate, tris(2,3-epoxypropyl)isocyanurate, 3',4'-epoxycyclohexylmethyl-3,4-epoxycyclohexanecarboxylate, or tetra(3,4-epoxycyclohexylmethyl)butanetetracarboxylate-modified ε-caprolactone.

Examples of the polyfunctional (meth)acrylate compound also include polyfunctional epoxy (meth)acrylates synthesized by reacting (meth)acrylic acid with a homopolymer or copolymer obtained by radical polymerization of a (meth)acrylate monomer having an epoxy group, such as glycidyl (meth)acrylate, glycidyloxybutyl (meth)acrylate, or 3,4-epoxycyclohexylmethyl (meth)acrylate. The copolymer herein refers to a polymer obtained by polymerizing two or more kinds of monomers. The copolymer may be a copolymer obtained by polymerizing two or more (meth)acrylates each having an epoxy group, or may be a copolymer obtained by polymerizing a (meth)acrylate having an epoxy group and another (meth)acrylate.

Examples of commercially available products of the polyfunctional (meth)acrylate compound include the following products.

ARONIX [registered trademark] M-208, M-210, M-211B, M-215, M-220, M-225, M-233, M-240, M-245, M-260, M-270, M-303, M-305, M-306, M-309, M-310, M-313, M-315, M-321, M-350, M-360, M-400, M-402, M-403, M-404, M-405, M-406, M-408, M-450, M-452, M-460, M-510, M-520, M-1100, M-1200, M-1210, M-1310, M-1600, M-1960, M-6100, M-6200, M-6250, M-6500, M-7100, M-7300K, M-8030, M-8060, M-8100, M-8530, M-8560, and M-9050 (manufactured by TOAGOSEI CO., LTD.).

KAYARAD [registered trademark] NPGDA, PEG400DA, FM-400, R-167, HX-220, HX-620, R-526, R-551, R-712, R-604, R-684, GPO-303, TMPTA, HDDA, TPGDA, KS-HDDA, KS-TPGDA, MANDA, THE-330, TPA-320, TPA-330, PET-30, T-1420, T-1420(T), RP-1040, DPHA, DPEA-12, D-310, D-330, DPCA-20, DPCA-30, DPCA-60, DPCA-120, FM-700, DN-0075, DN-2475, TC-120S, R-115, R-130, R-381, EAM-2160, CCR-1291H, CCR-1235, ZAR-1035, ZAR-2000, ZFR-1401H, ZFA-1491H, ZCR-1569H, ZCR-1601H, ZCR-1797H, ZCR-1798H, UXE-3000, UXE-3024, UX-3204, UX-4101, UXT-6100, UX-6101, UX-7101, UX-810I, UX-0937, UXF-4001-M35, UXF-4002, DPHA-40H, UX-5000, UX-5102D-M20, UX-5103D, and UX-5005 (manufactured by Nippon Kayaku Co., Ltd.).

NK Ester A-200, A-400, A-600, A-1000, A-1500, A-2000, ABE-300, A-BPE-4, A-BPE-6, A-BPE-10, A-BPE-20, A-BPE-30, A-BPEF, A-BPP-3, A-DCP, A-DOD-N, A-HD-N, A-NOD, A-GLY-3E, A-GLY-9E, A-GLY-20E, A-TMPT, A-TMPT-3EO, A-TMPT-9EO, ATM-4E, ATM-35E, APG-100, APG-200, APG 00, APG-700, A-PTMG-65, A-1000PER, A-B1206PE, 701A, A-9300, A-9300-1CL, A-9300-6CL, A-9530, ADP-51EH, ATM-31EH, A-TMM-3, A-TMM-3L, A-TMM-3LM-N, AD-TMP, A-TMMT, A-9550, A-DPH, A-DPH-12E, 1G, 2G, 3G, 4G, 9G, 14G, 23G, BPE-80N, BPE-100, BPE-100N, BPE-200, BPE-500, BPE-900, BPE-1300N, DCP, DOD-N, HD-N, NOD-N, NPG, 1206PE, 701, 3PG, 9PG, and TMPT; NK Economer A-PG5009E, A-PG5027E, and A-PG5054E; and NK Oligo U-2PPA, U-6LPA, U-10HA, U-10PA, UA-1100H, U-4H, U-6H, U-4HA, U-6HA, U-15HA, UA-32P, UA-33H, UA-53H, U-200PA, U-324A, UA-160TM, UA-290TM, UA-4200, UA-4400, UA-122P, UA-7100, and UA-W2A (manufactured by Shin-Nakamura Chemical Co., Ltd.).

Viscoat #195, #230, #260, #3101HP, #335HP, #700HV, #540, #802, #295, #300, #360, and #230D; BAC-45, SPDBA-S30, and STAR-501 (manufactured by Osaka Organic Chemical Industry Ltd.).

LIGHT ESTER P-2M, EG, 2EG, 3EG, 4EG, 9EG, 14EG, 1.4BG, NP, 1.6HX, 1.9ND, G-101P, G-201P, BP-2EMK, and TMP; LIGHT ACRYLATE [registered trademark] 3EG-A, 4EG-A, 9EG-A, 14EG-A, PTMGA-250, NP-A, MPD-A, 1.6HX-A, 1.9ND-A, MOD-A, DCP-A, BP-4EAL, BP-4PA, HPP-A, G-201P, TMP-A, PE-3A, PE-4A, and DPE-6A; EPDXY ESTER 40EM, 70PA, 200PA, 80MFA, 3002M(N), 3002A(N), 3000MK, 3000A, and EX-0205; AH-600, AT UA-306H, UA-306T, UA-306I, UA-510H, UF-8001G, and DAUA-167 (manufactured by Kyoeisha Chemical Co., Ltd.).

Art-Resin [registered trademark] UN-333, UN-350, UN-1255, UN-2600, UN-2700, UN-5200, UN-5500, UN-5590, UN-5507, UN-6060PTM, UN-6200, UN-6202, UN-6300, UN-6301, UN-7600, UN-7700, UN-9000H, UN-9000PEP, UN-9200A, UN-3320HA, UN-3200HB, UN-3320HC, UN-3320HS, UN-904, UN-906S, UN-901T, UN-905, UN-906, UN-952, HDP-4T, HMP-2, H-61, and HDP-M20 (manufactured by Negami Chemical Industrial Co., Ltd.).

SHIKOH [registered trademark] UV-1400B, UV-1700B, UV-2000B, UV-2010B, UV-2750B, UV-3000B, UV-3200B, UV-3210EA, UV-3300B, UV-3310B, UV-3500BA, UV-3520TL, UV-3610D80, UV-3630D80, UV-3640PE80, UV-3700B, UV-6100B, UV-6300B, UV-6640B, UV-7000, UV-7000B, UV-7461TE, UV-7510B, UV-7550B, UV-7600B, UV-7605B, UV-7610B, UV-7620EA, UV-7630B, UV-7640B, UV-7650B, UV-NS001, UV-NS034, UV-NS054, UV-NS063, and UV-NS077 (manufactured by The Nippon Synthetic Chemical Industry Co., Ltd.).

BEAMSET [registered trademark] 243NS, 255, 261, 271, 502H, 504H, 505A-6, 550B, 575, 577, 700, 710, 730, 750, AQ-17, EM-90, EM-92, 371, and 381 (manufactured by ARAKAWA CHEMICAL INDUSTRIES, LTD.).

FANCRYL [registered trademark] FA-124AS, FA-129AS, FA-222A, FA-240A, FA-P240A, FA-P270A, FA-321A, FA-324A, FA-PTG9A, FA-731A, FA-121M, FA-124M, FA-125M, FA-220M, FA-240M, FA-320M, FA-321M, FA-3218M, FA-PTG9M, and FA-137M (manufactured by Hitachi Chemical Company, Ltd.).

SR212, SR213, SR230, SR238F, SR259, SR268, SR272, SR306H, SR344, SR349, SR508, CD560, CD561, CD564, SR601, SR602, SR610, SR833S, SR9003, CD9043, SR9045, SR9209, SR205, SR206, SR209, SR210, SR214, SR231, SR239, SR248, SR252, SR297, SR348, SR480, CD540, CD541, CD542, SR603, SR644, SR9036, SR351S, SR368, SR415, SR444, SR454, SR492, SR499, CD501, SR502, SR9020, CD9021, SR9035, SR350, SR295, SR355, SR399, SR494, SR9041, SR9041, CN929, CN961E75, CN961H81, CN962, CN963, CN963A80, CN963B80, CN963E75, CN963E80, CN963J85, CN964, CN964E75, CN964A85, CN965, CN965A80, CN966A80, CN966H90, CN966J75, CN966R60, CN968, CN980, CN981, CN981A75, CN981B88, CN982, CN982A75, CN982B88, CN982E75, CN983, CN985B88, CN996, CN9001, CN9002, CN9788, CN9893, CN970A60, CN970E60, CN971, CN971A80, CN972, CN973A80, CN973H85, CN973J75, CN975, CN977C70, CN978, CN9782, CN9783, CN104, CN104A80, CN104B80, CN111, CN112C60, CN115, CN116, CN118, CN120, CN120A60, CN120A75, CN120B60, CN120B80, CN120C60, CN120C80, CN120D80, CN102E50, CN120M50, CN124, CNUVE151, CNUVE151/80, CN151, CN2203, CN2270, CN2271, CN2273, CN2274, CN307, CN371, CN550, CN551, SB401, SB402, SB404, SB500E50, SB500K60, SB510E35, SB520E35, and SB520M35 (manufactured by SARTOMER).

DPGDA, HODA, TPGDA, PEG400 DA-D, HPNDA, PETIA, PETRA, TMPTA, TMPEOTA, OTA480, DPHA, IRR214-K, IRR679, IRR742, IRR793, (ACA)Z200M, (ACA)Z230AA, (ACA)Z250, (ACA)Z251, (ACA)Z300, (ACA)Z320, (ACA)Z254F, EBERCRYL [registered trademark] 145, 150, 11, 135, 40, 140, 1142, 180, 204, 205, 210, 215, 220, 230, 244, 245, 264, 265, 270, 280/151B, 284, 285, 294/25HD, 1259, 1290, 4820, 4858, 5129, 8210, 8254, 8301R, 8307, 8402, 8405, 8411, 8465, 8800, 8804, 8807, 9260, 9270, 8311, 8701, 9227EA, 436, 438, 446, 450, 524, 525, 770, 800, 810, 811, 812, 1830, 846, 851, 852, 853, 1870, 884, 885, 600, 605, 645, 648, 860, 1606, 3500, 3603, 3608, 3700, 3701, 3702, 3703, 3708, 6040, 8110, 271, 1258, 1291, 4100, 4200, 4500, 4680, 4220, 4265, 4491, 4513, 4587, 4666, 4683, 4738, 4740, 4250, and 4510; and KRIM [registered trademark] 8200, 8200AE, 8296, 8452, 8904, 8667, 8912, 8981, 8762, 8713B, and 8528 (manufactured by DAICEL-ALLNEX LTD.).

BAEA-100, BAEM-100, BAEM-50, BEEM-50, BFEA-50, HPEA100, CNEA-100, PNEM-50, RNEA-100, TEA-100, KUA-4I, KUA-6I, KUA-9N, KUA-10H, KUA-15N, KUA-C2I, KUA-PC2I, KUA-PEA2I, KUA-PEB2I, KUA-PEC2I, RP-274S, and RP-310 (manufactured by KSM CO., Ltd.).

These polyfunctional (meth)acrylate compounds may be used alone, or two or more thereof may be used in combination.

The polyfunctional blocked isocyanate compound has, in one molecule, two or more isocyanate groups blocked by an appropriate protecting group, and is such that, when the compound is exposed to high temperatures at the time of thermosetting, the protecting group (the blocked portion) comes off due to thermal dissociation, and a crosslinking reaction is caused between a resultant isocyanate group and resin.

Such polyfunctional blocked isocyanate compound can be obtained by, for example, reacting a polyfunctional isocyanate compound having two or more isocyanate groups in one molecule thereof with an appropriate blocking agent.

Examples of the polyfunctional isocyanate compound include 1,4-tetramethylene diisocyanate, 1,5-pentamethylene diisocyanate, 1,6-hexamethylene diisocyanate, 2,2,4-trimethyl-1,6-hexamethylene diisocyanate, 1,3,6-hexamethylene triisocyanate, lysine diisocyanate, isophorone diisocyanate, 4,4'-dicyclohexylmethane diisocyanate, 1,3-bis(isocyanatemethyl)cyclohexane, 1,4-cyclohexyl diisocyanate, 2,6-bis(isocyanatemethyl)tetrahydrodicyclopentadiene, bis(isocyanatemethyl)dicyclopentadiene, bis(isocyanatemethyl)adamantane, 2,5-diisocyanatemethylnorbornene, norbornane diisocyanate, dicycloheptane triisocyanate, 4,4'-diphenylmethane diisocyanate, 2,4-tolylene diisocyanate, 2,6-tolylene diisocyanate, xylylene diisocyanate, tetramethylxylylene diisocyanate, 1,5-naphthalene diisocyanate, p-phenylene diisocyanate, 1,3-bis(isocyanatemethyl)benzene, dianisidine diisocyanate, 3,3'-dimethyldiphenyl-4,4'-diisocyanate, diphenyl ether diisocyanate, 2,6-bis(isocyanatemethyDdecahydronaphthalene, bis(diisocyanatetolyl)phenylmethane, 1,1'-methylenebis(3-methyl-4-isocyanatebenzene), 1,3-bis(1-isocyanate-1-methylethyl)benzene, 1,4-bis(1-isocyanate-1-methylethyl)benzene, 4,4'-biphenylene diisocyanate, 3,3'-dimethyl-4,4'-biphenylenediisocyanate, 3,3'-dimethoxy-4,4'-biphenylenediisocyanate, bis(isocyanatemethyl)thiophene, bis(isocyanatemethyl)tetrahydrothiophene, and modified compounds thereof (for example, an isocyanurate form, a biuret form, an ethylene glycol adduct form, a propylene glycol adduct form, a trimethylolpropane adduct form, an ethanol amine adduct form, a polyester polyol adduct form, a polyether polyol adduct form, a polyamide adduct form, and a polyamine adduct form).

Examples of the blocking agent include alcohols such as methanol, ethanol, isopropanol (2-propanol), n-butanol, heptanal; hexanol, 2-ethoxyhexanol, cyclohexanol, octanol, isononyl alcohol, stearyl alcohol, benzyl alcohol, 2-ethoxyethanol, methyl lactate, ethyl lactate, amyl lactate, ethylene glycol monomethyl ether, ethylene glycol monoethyl ether, ethylene glycol monobutyl ether, propylene glycol monomethyl ether, propylene glycol monoethyl ether, propylene glycol monopropyl ether, diethylene glycol monoethyl ether, diethylene glycol monobutyl ether, triethylene glycol monoethyl ether, N,N-dimethylaminoethanol, N,N-diethylaminoethanol, and N,N-dibutylaminoethanol; phenols, such as phenol, ethylphenol, propylphenol, butylphenol, octylphenol, nonylphenol, nitrophenol, chlorophenol, o-cresol, m-cresol, p-cresol, and xylenol; lactams, such as α-pyrrolidone, β-butyrolactam, β-propiolactam, γ-butyrolactam, δ-valerolactam, and ε-caprolactam; oximes, such as acetone oxime, methyl ethyl ketone oxime, methyl isobutyl ketone oxime, diethyl ketone oxime, cyclohexanone oxime, acetophenone oxime, and benzophenone oxime; pyrazoles, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; mercaptans, such as butyl mercaptan, hexyl mercaptan, dodecyl mercaptan, and benzenethiol; active methylene-based compounds, such as malonic diester, acetoacetic ester, malonic dinitrile, acetylacetone, methylenedisulfone, dibenzoylmethane, dipivaloylmethane, and acetonedicarboxylic acid diester; amines, such as dibutylamine, diisopropylamine, di-tert-butylamine, di(2-ethylhexyl)amine, dicyclohexylamine, benzylamine, diphenylamine, aniline, and carbazole; imidazoles, such as imidazole and 2-ethylimidazole; imines, such as methyleneimine, ethyleneimine, polyethyleneimine, and propyleneimine; acid amides, such as acetanilide, acrylamide, acetic acid amide, and dimer acid amide; acid imides, such as succinimid, maleimide, and phthalimide; and urea compounds, such as urea, thiourea, and ethylene urea. Furthermore, the blocking agent may be an internally blocked type resulting from uretdione bonding (dimerization of isocyanate groups).

Examples of commercially available products of the polyfunctional blocked isocyanate compound include the following products.

TAKENATE [registered trademark] B-815N, B-830, B-842N, B-846N, 13-870, B-870N, B-874, B-874N, B-882, B-882N, B-5010, B-7005, B-7030, and B-7075 (manufactured by Mitsui Chemicals, Inc.).

DURANATE [registered trademark] ME20-B80S, MF-B60B, MF-B60X, MF-B90B, MF-K60B, MF-K60X, SBN-70D, 17B-60P, 17B-60PX, TPA-B80E, TPA-B80X, E402-B80B, E402-B80T, and K6000 (manufactured by Asahi Kasei Chemicals Corporation).

CORONATE [registered trademark] 2503, CORONATE 2507, 2512, 2513, 2515, 2520, 2554, BI-301, and AP-M; and Millionate MS-50 (manufactured by Tosoh Corporation).

BURNOCK [registered trademark] D-500, D-550, and DB-980K (manufactured by DIC Corporation).

Sumidur [registered trademark] BL-3175, BL-4165, BL-4265, BL-1100, and BL-1265; Desmodur [registered trademark] TPLS-2957, TPLS-2062, TPLS-2078, TPLS-2117, and BL-3475; and Desmotherm [registered trademark] 2170 and 2265 (manufactured by Sumika Bayer Urethane Co., Ltd.).

TRIXENE BI-7641, BI-7642, BI-7986, BI-7987, BI-7950, BI-7951, BI-7960, BI-7961, BI-7963, BI-7981, BI-7982, BI-7984, BI-7986, BI-7990, BI-7991, BI-7992, BI-7770, BI-7772, BI-7779, and DP9C/214 (manufactured by Baxenden Chemicals Ltd.).

VESTANAT [registered trademark] B1358A, B1358/100, and B1370; and VESTAGON [registered trademark] B1065, B1400, B1530, BF1320, and BF1540 (manufactured by Evonik Industries AG).

Examples of the polyfunctional blocked isocyanate compound include a homopolymer or a copolymer obtained by radical polymerization of (meth)acrylate having a blocked isocyanate group. The copolymer herein refers to a polymer obtained by polymerizing two or more kinds of monomers. The copolymer may be a copolymer obtained by polymerizing two or more (meth)acrylates each having a blocked isocyanate group, or may be a copolymer obtained by polymerizing a (meth)acrylate having a blocked isocyanate group and another (meth)acrylate. Examples of commercially available products of such (meth)acrylate having a blocked isocyanate group include Karenz [registered trademark] MOI-BM, AOI-BM, MOI-BP, AOI-BP, MOI-DEM, MOI-CP, MOI-MP, MOI-OEt, MOI-OBu, and MOI-OiPr (manufactured by Showa Denko K.K.).

These polyfunctional blocked isocyanate compounds may be used alone, or two or more thereof may be used in combination.

In the case where the curing agent is used, the curing agent content of thermosetting resin composition according to the present invention is typically 1% by mass to 30% by mass, preferably 1% by mass to 20% by mass, or preferably 1% by mass to 10% by mass, with respect to the solid content of the resin composition.

<Other Additives>

The thermosetting resin composition according to the present invention may include a surfactant for the purpose of improving the coating properties. Examples of the surfactant include: nonionic surfactants, such as polyoxyethylene alkyl ethers such as polyoxyethylene lauryl ether, polyoxyethylene stearyl ether, polyoxyethylene cetyl ether, and polyoxyethylene oleyl ether, polyoxyethylene alkylaryl ethers such as polyoxyethylene octylphenyl ether and polyoxyethylene nonylphenyl ether, polyoxyethylene-polyoxypropylene block copolymers, sorbitan fatty acid esters such as sorbitan monolaurate, sorbitan monopalmitate, sorbitan monostearate, sorbitan monooleate, sorbitan trioleate, and sorbitan tristearate, polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan trioleate, and polyoxyethylene sorbitan tristearate; fluorine-based surfactants such as EFTOP (registered trademark) EF301, EF303, and EF352 (manufactured by Mitsubishi Materials Electronic Chemicals Co., Ltd.), MEGAFACE (registered trademark) F-171, F-173, R-30, R-40, and R-40-LM (manufactured by DIC Corporation), Fluorad FC430 and FC431 (manufactured by Sumitomo 3M Ltd.), AsahiGuard (registered trademark) AG710, Surflon (registered trademark) S-382, SC101, SC102, SC103, SC104, SC105, and SC106 (manufactured by Asahi Glass Co., Ltd.), and Ftergent-series such as FTX-206D, FTX-212D, FTX-218, FTX-220D, FTX-230D, FTX-240D, FTX-212P, FTX-220P, FTX-228P, FTX-240G, and DFX-18 (manufactured by NEOS Co., Ltd.); and organosiloxane polymer KP341 (manufactured by Shin-Etsu Chemical Co., Ltd.). These surfactants may be used alone, or two or more thereof may be used in combination.

In the case where the surfactant is used, the surfactant content of the thermosetting resin composition according to the present invention is typically 0.001% by mass to 3% by mass, preferably 0.01% by mass to 2% by mass, more preferably 0.03% by mass to 1©% by mass, with respect to the solid content of the resin composition.

The thermosetting resin composition according to the present invention may include additives such as a radical polymerization initiator, an acid compound, a light stabilizer, an ultraviolet absorber, a sensitizer, a plasticizer, an antioxidant, an adhesive aid, and a defoaming agent, as necessary, as long as such an additive does not interfere with the effect of the present invention.

<Method for Producing Cured Film, Protective Film, and Planarizing Film>

A method for producing a cured film, a protective film, and a planarizing film by using the thermosetting resin composition according to the present invention will be described. The thermosetting resin composition according to the present invention is applied onto a substrate (for example, a semiconductor substrate, a glass substrate, a quartz substrate, a silicon wafer, or any of these substrates on the surface of which, for example, a metal film or a color filter is formed) by a suitable coating methods, such as a spinner or a coater, and subsequently baked by using heating means, such as a hot plate or an oven, to be cured, so that a cured film, a protective film, or a planarizing film is produced. Conditions for the baking are appropriately selected from baking temperatures in a range of 80° C. to 300° C. and baking time in a range of 0.5 minutes to 60 minutes. The baking may be conducted in two or more steps at different baking temperatures. The film thickness of a film produced from the thermosetting resin composition according to the present invention is, for example, 0.001 μm to 1000 μm, preferably 0.01 μm to 100 μm, more preferably 0.1 μm to 10 μm.

EXAMPLES

Hereinafter, the present invention will be described in further detail according to Examples and Comparative Examples, but, the present invention is not limited to these examples.

Measurement of Weight-Average of Copolymer Obtained in Synthesis Examples

Apparatus: GPC system, manufactured by JASCO Corporation
Column: Shodex [registered trademark] KF-804L and -803L
Column Oven: 40° C.
Flow Rate: 1 mL/minute
Eluent: tetrahydrofuran Synthesis of Polymer Synthesis Example 1

22.0 g of monoallyl diglycidyl isocyanurate MA-DGIC (manufactured by SHIKOKU CHEMICALS CORPORATION)), 9.5 g of fumaric acid, and 0.9 g of benzyl triethyl ammonium chloride were dissolved in 129.7 g of propylene glycol monomethyl ether. Subsequently, the resultant solution was allowed to react under heating to reflux for 6 hours, so that a solution of a polymer (solid-content concentration: 20% by mass) was obtained. The obtained polymer had a weight-average molecular weight Mw of 7,500.

Synthesis Example 2

20.0 g of monoallyl diglycidyl isocyanurate (MA-DGIC (manufactured by SHIKOKU CHEMICALS CORPORATION)), 9.7 g of succinic acid, and 0.9 g of benzyl triethyl ammonium chloride were dissolved in 130.4 g of propylene glycol monomethyl ether. Subsequently, the resultant solution was allowed to react under heating to reflux for 6 hours, so that a solution of a polymer (solid-content concentration:

20% by mass) was obtained. The obtained polymer had a weight-average molecular weight Mw of 2,500.

Synthesis Example 3

22.0 g of diglycidyl terephthalate (Denacol [registered trademark] EX-711 (manufactured by Nagase ChemteX Corporation)), 9.6 g of fumaric acid, and 0.9 g of benzyl triethyl ammonium chloride were dissolved in 130.1 g of propylene glycol monomethyl ether. Subsequently, the resultant solution was allowed to react under heating to reflux for 6 hours, so that a solution of a polymer (solid-content concentration: 20% by mass) was obtained. The obtained polymer had a weight-average molecular weight Mw of 5,100.

Synthesis Example 4

40.0 g of 2-[(3,5-dimethylpyrazolyl)carbonylamino]ethyl methacrylate (Karenz [registered trademark] MOI-BP (manufactured by Showa Denko K.K.)) and 2.6 g of 2,2'-azobisisobutyronitrile were dissolved in 79.1 g of propylene glycol monomethyl ether. Subsequently, the resultant solution was added dropwise over 3 hours into a flask in which 48.7 g of propylene glycol monomethyl ether was kept at 80° C. After the dropwise addition was completed, the resultant mixture was further allowed to react for 18 hours to obtain a solution of a polymer (solid-content concentration: 25% by mass). The obtained polymer had a weight-average molecular weight Mw of 14,500.

Synthesis Example 5

40.0 g of methyl methacrylate, 4.7 g of 2-hydroxyethyl methacrylate, 2.4 g of methacrylic acid, and 3.1 g of 2,2'-azobisisobutyronitrile were dissolved in 55.7 g of propylene glycol monomethyl ether acetate. Subsequently, this resultant solution was added dropwise over 4 hours into a flask in which 55.7 g of propylene glycol monomethyl ether acetate was kept at 70° C. After the dropwise addition was completed, the resultant mixture was further allowed to react for 18 hours to obtain a solution of a polymer (solid-content concentration: 30% by mass). The obtained polymer had a weight-average molecular weight Mw of 9,300.

Synthesis Example 6

22.0 g of styrene, 13.7 g of 2-hydroxyethyl methacrylate, 26.5 g of 2-[(3,5-dimethylpyrazolyl)carbonylamino]ethyl methacrylate (Karenz [registered trademark] MOI-BP (manufactured by Showa Denko K.K.)), and 2.8 g of 2,2'-azobisisobutyronitrile were dissolved in 65.1 g of propylene glycol monomethyl ether. Subsequently, the resultant solution was added dropwise over 4 hours into a flask in which 32.5 g of propylene glycol monomethyl ether was kept at 70° C. After the dropwise addition was completed, the resultant mixture was further allowed to react for 18 hours to obtain a solution of a polymer (solid-content concentration: 40% by mass). The obtained polymer had a weight-average molecular weight Mw of 25,000.

Preparation of Thermosetting Resin Composition

Example 1

20.0 g of the polymer solution obtained in Synthesis Example 1 and 0.01 g of DFX-18 (manufactured by NEOS Co., Ltd.) as a surfactant were dissolved in 7.5 g of propylene glycol monomethyl ether and 5.9 g of ethyl lactate to prepare a solution. Subsequently, the resultant solution was filtered using a polyethylene microfilter having a pore size of 0.10 μm to prepare a thermosetting resin composition. In the present example, a curing agent was not added.

Example 2

20.0 g of the polymer solution obtained in Synthesis Example 1, 0.6 g of a polyfunctional acrylate compound, namely, KAYARAD [registered trademark] DPHA (manufactured by Nippon Kayaku Co., Ltd.) as a curing agent, and 0.01 g of DFX-18 (manufactured by NEOS Co., Ltd.) as a surfactant were dissolved in 11.1 g of propylene glycol monomethyl ether and 6.8 g of ethyl lactate to prepare a solution. Subsequently, the resultant solution was filtered using a polyethylene microfilter having a pore size of 0.10 μm to prepare a thermosetting resin composition.

Example 3

20.0 g of the polymer solution obtained in Synthesis Example 1, 0.6 g of a polyfunctional acrylate compound, namely, Viscoat #802 (manufactured by Osaka Organic Chemical Industry Ltd.) as a curing agent, and 0.01 g of DFX-18 (manufactured by NEOS Co., Ltd.) as a surfactant were dissolved in 11.1 g of propylene glycol monomethyl ether and 6.8 g of ethyl lactate to prepare a solution. Subsequently, the resultant solution was filtered using a polyethylene microfilter having a pore size of 0.10 μm to prepare a thermosetting resin composition.

Example 4

20.0 g of the polymer solution obtained in Synthesis Example 1, 0.6 g of a polyfunctional urethane acrylate compound, namely, UA-510H (manufactured by Kyoeisha Chemical Co., Ltd.) as a curing agent, and 0.01 g of DFX-18 (manufactured by NEOS Co., Ltd.) as a surfactant were dissolved in 11.1 g of propylene glycol monomethyl ether and 6.8 g of ethyl lactate to prepare a solution. Subsequently, the resultant solution was filtered using a polyethylene microfilter having a pore size of 0.10 μm to prepare a thermosetting resin composition.

Example 5

20.0 g of the polymer solution obtained in Synthesis Example 1, 0.8 g of a polyfunctional blocked isocyanate compound, namely, TRIXENE BI-7982 (a propylene glycol monomethyl ether solution, solid-content concentration: 70% by mass) (manufactured by Baxenden Chemicals Ltd.) as a curing agent, and 0.01 g of DFX-18 (manufactured by NEOS Co., Ltd.) as a surfactant were dissolved in 10.8 g of propylene glycol monomethyl ether and 6.8 g of ethyl lactate to prepare a solution. Subsequently, the resultant solution was filtered using a polyethylene microfilter having a pore size of 0.10 μm to prepare a thermosetting resin composition.

Example 6

20.0 g of the polymer solution obtained in Synthesis Example 1, 0.8 g of a polyfunctional blocked isocyanate compound, namely, TAKENATE [registered trademark] B-882N (a solution of butyl acetate and solvent naphtha, solid-content concentration: 70% by mass) (manufactured by Mitsui Chemicals, Inc.) as a curing agent, and 0.01 g of DFX-18 (manufactured by NEOS Co., Ltd.) as a surfactant were dissolved in 10.8 g of propylene glycol monomethyl ether and 6.8 g of ethyl lactate to prepare a solution. Subsequently, the resultant solution was filtered using a polyethylene microfilter having a pore size of 0.10 μm to prepare a thermosetting resin composition.

Example 7

20.0 g of the polymer solution obtained in Synthesis Example 1, 2.4 g of a polyfunctional blocked isocyanate compound, that is, the polymer solution obtained in Synthesis Example 4 as a curing agent, and 0.01 g of DFX-18 (manufactured by NEOS Co., Ltd.) as a surfactant were dissolved in 9.3 g of propylene glycol monomethyl ether and 6.8 g of ethyl lactate to prepare a solution. Subsequently, the resultant solution was filtered using a polyethylene microfilter having a pore size of 0.10 μm to prepare a thermosetting resin composition.

Comparative Example 1

20.0 g of the polymer solution obtained in Synthesis Example 2 and 0.01 g of DFX-18 (manufactured by NEOS Co., Ltd.) as a surfactant were dissolved in 7.5 g of propylene glycol monomethyl ether and 5.9 g of ethyl lactate to prepare a solution. Subsequently, the resultant solution was filtered using a polyethylene microfilter having a pore size of 0.10 μm to prepare a resin composition. The polymer used in Comparative Example 1 does not have a structural unit of Formula (1).

Comparative Example 2

20.0 g of the polymer solution obtained in Synthesis Example 3 and 0.01 g of DFX-18 (manufactured by NEOS Co., Ltd.) as a surfactant were dissolved in 7.5 g of propylene glycol monomethyl ether and 5.9 g of ethyl lactate to prepare a solution. Subsequently, the resultant solution was filtered using a polyethylene microfilter having a pore size of 0.10 μm to prepare a resin composition. The polymer used in Comparative Example 2 does not have a structural unit of Formula (1).

Comparative Example 3

20.0 g of the polymer solution obtained in Synthesis Example 1, 0.6 g of a methylated melamine resin (NIKA-LAC [registered trademark] MW-390 (manufactured by SANWA Chemical Co., Ltd)) as a curing agent, 0.06 g of p-toluenesulfonic acid monohydrate as a curing catalyst, and 0.01 g of DFX-18 (manufactured by NEOS Co., Ltd.) as a surfactant were dissolved in 11.4 g of propylene glycol monomethyl ether and 6.9 g of ethyl lactate to prepare a solution. Subsequently, the resultant solution was filtered using a polyethylene microfilter having a pore size of 0.10 pin to prepare a thermosetting resin composition. The curing agent used in Comparative Example 3 is neither a polyfunctional (meth)acrylate compound nor a polyfunctional blocked isocyanate compound.

Comparative Example 4

10.0 g of the polymer solution obtained in Synthesis Example 5, 0.9 g of a methylated melamine resin (NIKA-LAC [registered trademark] MX-706 (a 2-propanol solution, solid-content concentration: 70% by mass) (manufactured by SANWA Chemical Co., Ltd)) as a curing agent, and 0.01 g of DFX-18 (manufactured by NEOS Co., Ltd.) as a surfactant were dissolved in 13.0 g of propylene glycol monomethyl ether and 6.2 g of propylene glycol monomethyl ether acetate to prepare a solution. Subsequently, the resultant solution was filtered using a polyethylene microfilter having a pore size of 0.10 μm to prepare a thermosetting resin composition. The polymer used in Comparative Example 4 does not have a structural unit of Formula (1). Furthermore, the curing agent used in Comparative Example 4 is neither a polyfunctional (meth)acrylate compound nor a polyfunctional blocked isocyanate compound.

Comparative Example 5

10.0 g of the polymer solution obtained in Synthesis Example 6 was dissolved in 17.5 g of propylene glycol monomethyl ether and 5.9 g of ethyl lactate to prepare a solution. Subsequently, the resultant solution was filtered using a polyethylene microfilter having a pore size of 0.10 μm to prepare a thermosetting resin composition. The polymer used in Comparative Example 5 does not have a structural unit of Formula (1).

Solvent Resistance Test

Each of the thermosetting resin compositions prepared in Examples 1 to 7 and Comparative Examples 3 to 5 and the resin compositions prepared in Comparative Examples 1 and 2 was applied onto a silicon wafer by using a spin coater, and baked on a hot plate at 100° C. for 1 minute and further at 230° C. for 5 minutes to form a film having a film thickness of 0.5 μm. Each of these resultant films was immersed in propylene glycol monomethylether, propylene glycol monomethylether acetate, butyl acetate, ethyl lactate, methyl 3-methoxy propionate, ethyl 3-ethoxypropionate, acetone, methyl ethyl ketone, cyclohexanone, γ-butyrolactone, N-methylpyrrolidone, 2-propanol, and a tetramethylammonium hydroxide aqueous solution having a concentration of 2.38% by mass, wider a temperature condition of 23° C. for 5 minutes, and subsequently dried and baked at 100° C. for 1 minute. The film thicknesses of each film before the immersion and after the dry-baking were measured to calculate a change in the film thickness. The solvent resistance of each component was evaluated as "x" if, for even one of the immersion solvents, the film thickness was increased or decreased by 10% or more of the film thickness before the immersion, and evaluated as "○" if, for all of the immersion solvents, the film thickness was increased or decreased by less than 10% of the film thickness before the immersion. Table 1 lists the results of evaluations.

Measurement of Transmittance

Each of the thermosetting resin compositions prepared in Examples 1 to 7 and Comparative Examples 3 to 5 was applied onto a quartz substrate by using a spin coater, and baked on a hot plate at 100° C. for 1 minute and further at 230° C. for 5 minutes to form a film having a film thickness of 0.5 μm. The transmittance of each of these resultant films was measured for every 2-nm change in wavelength in a range from 400 urn to 800 nm by using an ultraviolet-visible spectrophotometer, UV-2550 (manufactured by Shimadzu Corporation). Each of these films was further heated at 260° C. for 5 minutes, and subsequently the transmittance thereof was measured again for every 2-nm change in wavelength in a range from 400 nm to 800 nm. Table 1 lists values of the minimum transmittance measured at wavelengths in a range of 400 nm to 800 nm, before and after the heating at 260° C. for 5 minutes.

Level Difference Planarization Properties

Using a spin coater, Each of the thermosetting resin compositions prepared in Examples 1 to 7 and Comparative Examples 3 to 5 was applied onto a substrate with a level difference. The substrate had a height of 0.5 μm, a line width of 10 μm, and a space-between-lines of 10 μm (see FIG. 1). The substrate was baked on a hot plate at 100° C. for 1 minute and further at 230° C. for 5 minutes to form a film having a film thickness of 0.5 μm. Using "expression: $(1-(h2/h1))\times 100$", the planarization ratio was calculated from values of h1 (the level difference of a substrate with a level difference) and h2 (the level difference of a cured film, that is, difference in height between the height of a cured film on a line and the height of the cured film in a space). The values of h1 and h2 are shown in a substrate with a level difference 1 in FIG. 1.

Table 1 lists the results of evaluations.

TABLE 1

| | Solvent Resistance | Minimum Transmittance/% (wavelength: 400 nm to 800 nm) | | Planarization Ratio/% |
|---|---|---|---|---|
| | | 230° C. | 260° C. | |
| Example 1 | ○ | 97 | 97 | 82 |
| Example 2 | ○ | 97 | 97 | 75 |
| Example 3 | ○ | 97 | 97 | 75 |
| Example 4 | ○ | 97 | 97 | 76 |
| Example 5 | ○ | 97 | 97 | 66 |
| Example 6 | ○ | 97 | 97 | 62 |
| Example 7 | ○ | 97 | 97 | 55 |
| Comparative Example 1 | X | — | — | — |
| Comparative Example 2 | X | — | — | — |
| Comparative Example 3 | ○ | 97 | 97 | 42 |
| Comparative Example 4 | ○ | 97 | 97 | 40 |
| Comparative Example 5 | ○ | 97 | 97 | 40 |

The results in Table 1 reveal that the cured films produced from the thermosetting resin composition according to the present invention were highly solvent resistant as well as highly transparent at wavelengths in a range of 400 nm to 800 nm. Furthermore, the cured films produced from the thermosetting resin composition according to the present invention had level difference planarization properties with a planarization ratio of more than 50%. In particular, the cured films produced from the respective thermosetting resin compositions prepared in Examples 1 to 4 had higher level difference planarization properties with a planarization ratio of 75% or more. In contrast, the resin layers produced from the resin compositions prepared in Comparative Examples 1 and 2 did not show satisfactory solvent resistance. Furthermore, it was found that the cured films produced from the thermosetting resin compositions prepared in Comparative Examples 3 to 5 were highly solvent resistant as well as highly transparent at wavelengths in a range of 400 nm to 800 nm, but had poorer level difference planarization properties with a planarization ratio of less than 50%.

DESCRIPTION OF THE REFERENCE NUMERALS 1 substrate with a level difference
2 cured film
3 line width
4 space between lines
h1 level difference of substrate with a level difference
h2 level difference of cured film

The invention claimed is:

1. A thermosetting resin composition, comprising:
a polymer having a structural unit of Formula (1):

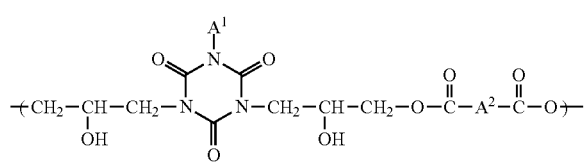

wherein $A^1$ is a $C_2$ or $C_3$ alkenyl group or alkynyl group, and $A^2$ is a $C_2$ alkenylene group or alkynylene group;
a curing agent in an amount of greater than 0% by mass and up to 30% by mass with respect to 100% by mass of the polymer; and
a solvent, wherein
the curing agent is at least one monomeric compound selected from the group consisting of polyfunctional (meth)acrylate compounds.

2. The thermosetting resin composition according to claim 1, wherein the polymer has a structural unit of Formula (1a):

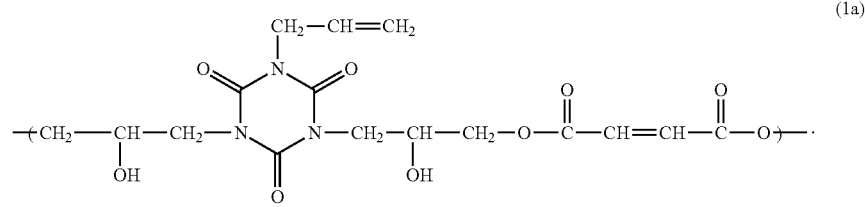

3. The thermosetting resin composition according to claim 1, wherein the curing agent is a polyfunctional acrylate compound.

4. The thermosetting resin composition according to claim 1, further comprising a surfactant.

5. The thermosetting resin composition according to claim 1, wherein the curing agent is present in an amount of 1% by mass to 30% by mass with respect to the solid content of the composition.

6. The thermosetting resin composition according to claim 1, wherein the curing agent is present in an amount of 1% by mass to 20% by mass with respect to the solid content of the composition.

7. The thermosetting resin composition according to claim 1, wherein the curing agent is present in an amount of 1% by mass to 10% by mass with respect to the solid content of the composition.

8. A planarizing film comprising a thermosetting resin prepared from the thermosetting resin composition according to claim 1.

9. A protective film comprising a thermosetting resin prepared from the thermosetting resin composition according to claim 1.

10. A method for producing a cured film, a protective film, or a planarizing film, the method comprising:
    applying the thermosetting resin composition as claimed in claim 1 onto a substrate; and
    subsequently baking the thermosetting resin composition at a sufficient temperature to be cured.

* * * * *